United States Patent
Lin et al.

(10) Patent No.: US 7,363,420 B2
(45) Date of Patent: Apr. 22, 2008

(54) METHOD AND FILE STRUCTURES FOR MANAGING DATA ON A FLASH DISK

(75) Inventors: Lin Lin, Belleville (CA); Ping Lin, Belleville (CA)

(73) Assignee: Nortel Networks Limited, St. Laurent, Ontario (CA)

( * ) Notice: Subject to any disclaimer, the term of this patent is extended or adjusted under 35 U.S.C. 154(b) by 486 days.

(21) Appl. No.: 10/734,280

(22) Filed: Dec. 15, 2003

(65) Prior Publication Data
US 2005/0132126 A1    Jun. 16, 2005

(51) Int. Cl.
G06F 12/00 (2006.01)
(52) U.S. Cl. ...................... 711/103; 711/173
(58) Field of Classification Search ................ 711/103, 711/173
See application file for complete search history.

(56) References Cited

U.S. PATENT DOCUMENTS

| | | | |
|---|---|---|---|
| 5,544,356 A * | 8/1996 | Robinson et al. ........... 707/205 |
| 6,535,949 B1 * | 3/2003 | Parker ......................... 711/103 |
| 6,536,038 B1 * | 3/2003 | Ewertz et al. .............. 717/168 |
| 2003/0078907 A1 * | 4/2003 | Soemo et al. .................. 707/1 |
| 2004/0158638 A1 * | 8/2004 | Peters et al. ................. 709/227 |

* cited by examiner

Primary Examiner—Woo H. Choi
(74) Attorney, Agent, or Firm—Ridout & Maybee LLP

(57) ABSTRACT

A method, apparatus and data structure for managing data in a memory device. The memory device is divided into two volumes. The first volume is intended for storing relatively static data, i.e. data which does not change or is not rewritten frequently. The second volume is intended for storing dynamic data, i.e. data which is changed or rewritten frequently. Each of the volumes is divided into a number of blocks, for example erase blocks, with each block being divided into sectors. In the dynamic volume, each of the erase blocks has one sector allocated for storing metadata, and the remaining sectors in the erase block are available for storing data, other than metadata. In the static volume, each of erase blocks can store more than one sector of metadata, in addition to data other than metadata. The metadata may be stored in consecutive sectors in the erase blocks. According to another aspect, the data structure is suitable for flash disk memory devices and flash disk memory devices used for multimedia applications.

14 Claims, 3 Drawing Sheets

METHOD AND FILE STRUCTURES FOR MANAGING DATA ON A FLASH DISK

FIELD OF THE INVENTION

The present invention relates to memory systems and more particularly to a method and file structures for managing data on a flash disk device.

BACKGROUND OF THE INVENTION

Flash memory is a type of nonvolatile storage device. Flash memory provides easy and fast information storage/retrieval in such devices as digital cameras, cellular phones, digital camcorders. Flash memory devices utilize EEPROM technology for the memory arrays, where EEPROM stands for Electrically Erasable Programmable Read Only Memory. Due to the achievable capacity and speed of accessing data, flash memory is commonly used in electronic devices that handle multimedia data.

In operation flash memory devices need to be erased before they can be written with new data. The finest granularity of erasure, known as an erase block, is typically much larger than the finest granularity for a read/write operation, also referred to as a sector. To write a single sector, the adjacent sectors in the erase block have to be recycled as well. If an erase block comprises NE sectors, then a single block write to a sector N involves the erase block whose first sector is N0=(N div NE)*NE and is logically performed as follows;

(1) read sectors N0 to N0+NE−1
(2) clear erase block
(3) replace sector N read in step (1) with new data
(4) write sectors N0 to N0+NE−1

If the system loses power during this write procedure, not only is sector N not written, but the sectors around sector N may also be corrupted as well. This can result in damage, i.e. data loss and/or corruption, in a file system which is implemented on a flash memory device.

One solution according to the prior art comprises repairing a damaged file system. This approach results in the loss of a large number of files if damage occurs to the file system's inode table. If a directory file is damaged or lost, then access is lost to all files below the damaged directory file, and they become orphans.

Another known solution in the art comprises file system journaling. The journaling is effective to handle writes which are not completed, but is not effective at finding corruption in data blocks that have been written. These corrupted data blocks may arise even though the transaction is shown as being successfully completed.

Accordingly, there remains a need for techniques for dealing with data on read/write memory devices such as flash disk devices.

BRIEF SUMMARY OF THE INVENTION

The present invention provides a method for managing data on a read/write memory device. According to one aspect, the method of distributing data is for a flash disk memory device.

In a first embodiment, the present invention provides a memory device for storing data, the data including metadata, the memory device comprises: a static volume comprising a plurality of static blocks, and each of the static blocks comprising a plurality of sectors; a dynamic volume comprising a plurality of dynamic blocks, and each of the dynamic blocks comprising a plurality of sectors; each of the dynamic blocks having one of the sectors allocated for writing and reading metadata, and the remaining sectors in the dynamic block being available for writing and reading data; and each of the static blocks having one or more sectors for writing and reading metadata, the remaining sectors in the static block being available for writing and reading data.

In another embodiment, the present invention provides a data structure for storing data on a memory device and the data includes metadata, the data structure comprises: a static volume comprising a plurality of sectors, each of the sectors being writable for storing data and readable for reading data; a dynamic volume comprising a plurality of sectors, each of the sectors being writable for storing data and readable for reading data; the sectors in the static volume being partitioned into blocks, each of the blocks having one or more sectors for writing and reading the metadata; the sectors in the dynamic blocks being partitioned into blocks, and each of the blocks having one sector for writing and reading the metadata, and the remaining sectors being available for reading and writing data.

In a further embodiment, the present invention provides a memory device for storing multimedia messages, the multimedia messages include media data and non-media data, the memory device comprises: a first volume comprising a plurality of first blocks, and each of the first blocks comprising a plurality of sectors; a second volume comprising a plurality of second blocks, and each of the second blocks comprises a plurality of sectors; each of the second blocks having one of the sectors allocated for writing and reading non-media data, and the remaining sectors in the second block being available for writing and reading media data; and each of the first blocks having one or more sectors for writing and reading metadata, the remaining sectors in the first block being available for writing and reading other data.

In yet another embodiment, the present invention provides a method for storing data on a flash disk memory device, the method comprises the steps of: dividing the memory into a static volume and a dynamic volume, the static volume comprises a plurality of static blocks, and each of the static blocks comprises a plurality of sectors, the dynamic volume comprises a plurality of dynamic blocks, and each of the dynamic blocks comprises a plurality of sectors; allocating one of the sectors in each of the dynamic blocks for writing and reading metadata; making the remaining sectors in each of the dynamic blocks available for writing and reading data; allocating one or more of the sectors in each of the static blocks for writing and reading metadata; making the remaining sectors in each of the static blocks available for writing and reading data.

In another embodiment, the present invention provides a memory device for storing data, the data includes metadata, the memory device comprises: first memory means for storing data, the first memory means includes a plurality of first memory blocks, and each of the first memory blocks has a plurality of sectors; second memory means for storing data, the second memory means includes a plurality of second memory blocks, and each of the second memory blocks has a plurality of sectors; each of the second memory blocks has one of the sectors allocated for writing and reading metadata, and the remaining sectors in the second memory block are available for writing and reading data; and each of the first memory blocks has one or more sectors for writing and reading metadata, the remaining sectors in the first memory block are available for writing and reading data.

In a further embodiment, the present invention provides a method for storing multimedia messages in memory, the multimedia message comprises media data and non-media data, the method comprises the steps of dividing the memory into a number of blocks, and sub-dividing each of the blocks into a number of sectors; allocating one or a portion of the sector in each of the blocks for writing and reading non-media data; allocating the remaining sectors in each of the blocks for writing and reading media data.

Other aspects and functions of the present invention will become apparent to those ordinarily skilled in the art upon review of the following description of specific embodiments of the invention in conjunction with the accompanying drawings

BRIEF DESCRIPTION OF THE DRAWINGS

Reference is next made to the accompanying drawings which show, by way of example, embodiments of the invention and in which.

In the drawings, like reference numerals indicate like elements

DETAILED DESCRIPTION OF THE EMBODIMENTS

Figure 1:
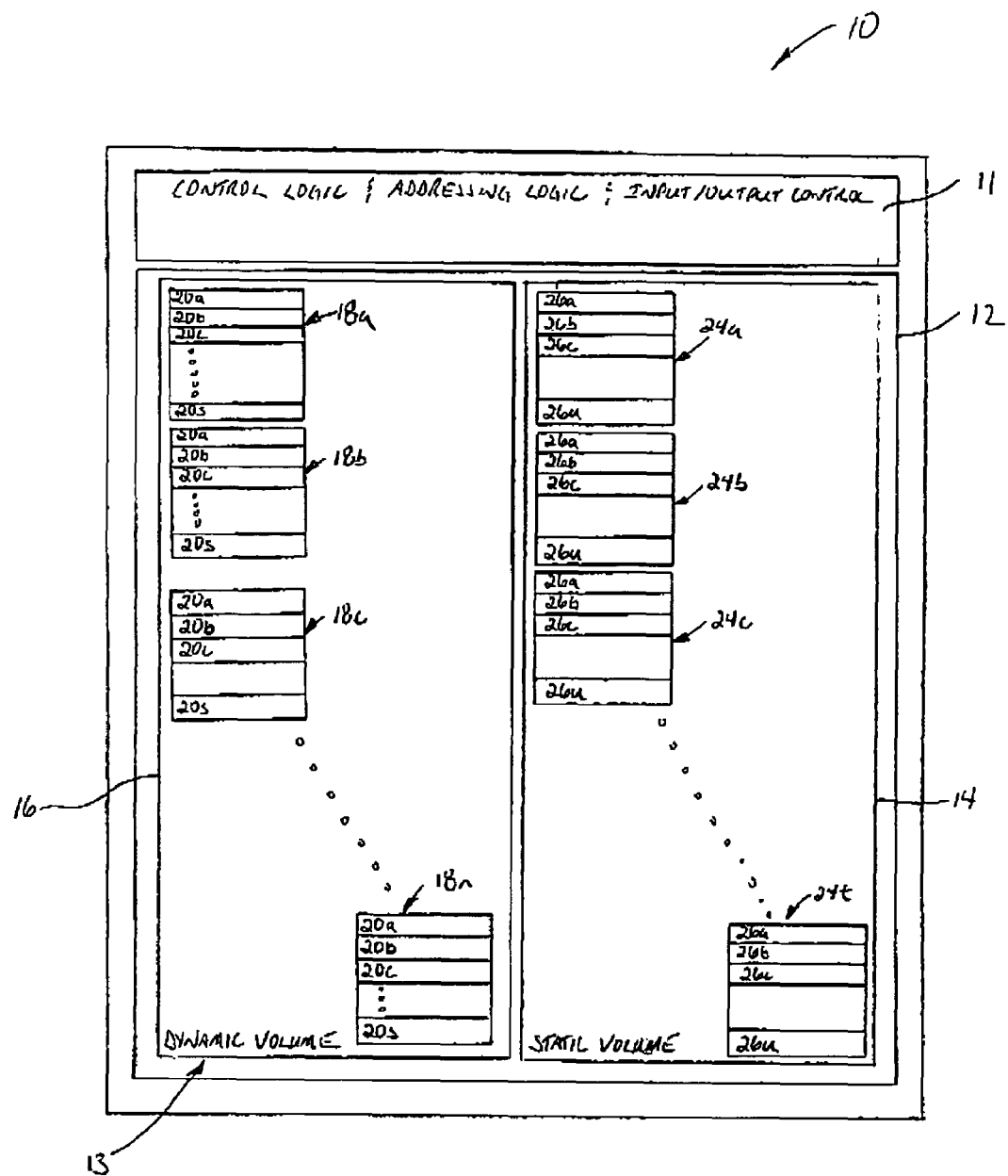
FIG. 1 shows in diagrammatic form a flash disk memory device configured in accordance with the present invention.

Reference is first made to FIG. 1 which shows in diagrammatic form a flash disk memory device configured according to the present invention. The flash disk memory device is indicated generally by reference 10. While the present invention is described in the context of a flash disk memory device, it will be appreciated that the invention is suitable for other memory applications.

As shown in FIG. 1, the flash disk memory device 10 comprises control logic 11 and memory media 12. The control logic 11 controls the addressing of memory cells in the memory media 12, the writing/reading of data from the memory media 12, and the input/output interface between the flash disk memory device 10 and the external device(s) (not shown). The flash disk memory device 10 includes a file system in accordance with the present invention and is denoted by reference 13. The file system 13 comprises a first volume 14 and a second volume 16. According to this aspect, the first volume 14 comprises a static volume, and is configured to store relatively static files and data, i.e. data that is relatively constant and is not rewritten frequently. The second volume 16 comprises a dynamic volume, and is configured to store dynamic data, i.e. files and data that change often. While the file system 13 is described as comprising two volumes: one volume for storing relatively static data, and another volume for storing dynamic data, it is to be appreciated that the file system may include more than one dynamic data volume.

The second, i.e. dynamic, volume 16 comprises erase blocks 18, shown individually as 18a, 18b, 18c, ... 18n, and metadata sectors 22, shown individually as 22a, 22b, 22c, ... 22m. Each of the erase blocks 18 comprises a plurality of sectors 20, shown individually as 20a, 20b, 20c, ... 20s. The metadata sectors 22 are spaced out or arranged so that each of the erase blocks 18 includes one metadata sector 22, for example the sector 20a shown in FIG. 1. The other sectors 22, e.g. 22b to 22s, are used to store file data. This provides an arrangement in which the loss of one erase block results in the loss of at most one metadata sector.

The first, i.e. static, volume 14 also comprises a plurality of erase blocks 24, shown individually as 24a, 24b, 24c, ... 24t in FIG. 1. Each of the erase blocks 24 comprises a plurality of sectors 26, shown individually as 26a, 26b, 26c, ... 26u. According to this aspect, the sectors 26 in the erase blocks 24 may comprise more than one or all metadata sectors 28. The remaining sectors in the erase block are utilized to store relatively static data. The relatively static data includes program executables and web pages. This arrangement allows the static volume 14 to support a higher ratio of metadata sectors to file data sectors, which in turn, is useful for storing many small files.

Figures 2A, 2B:
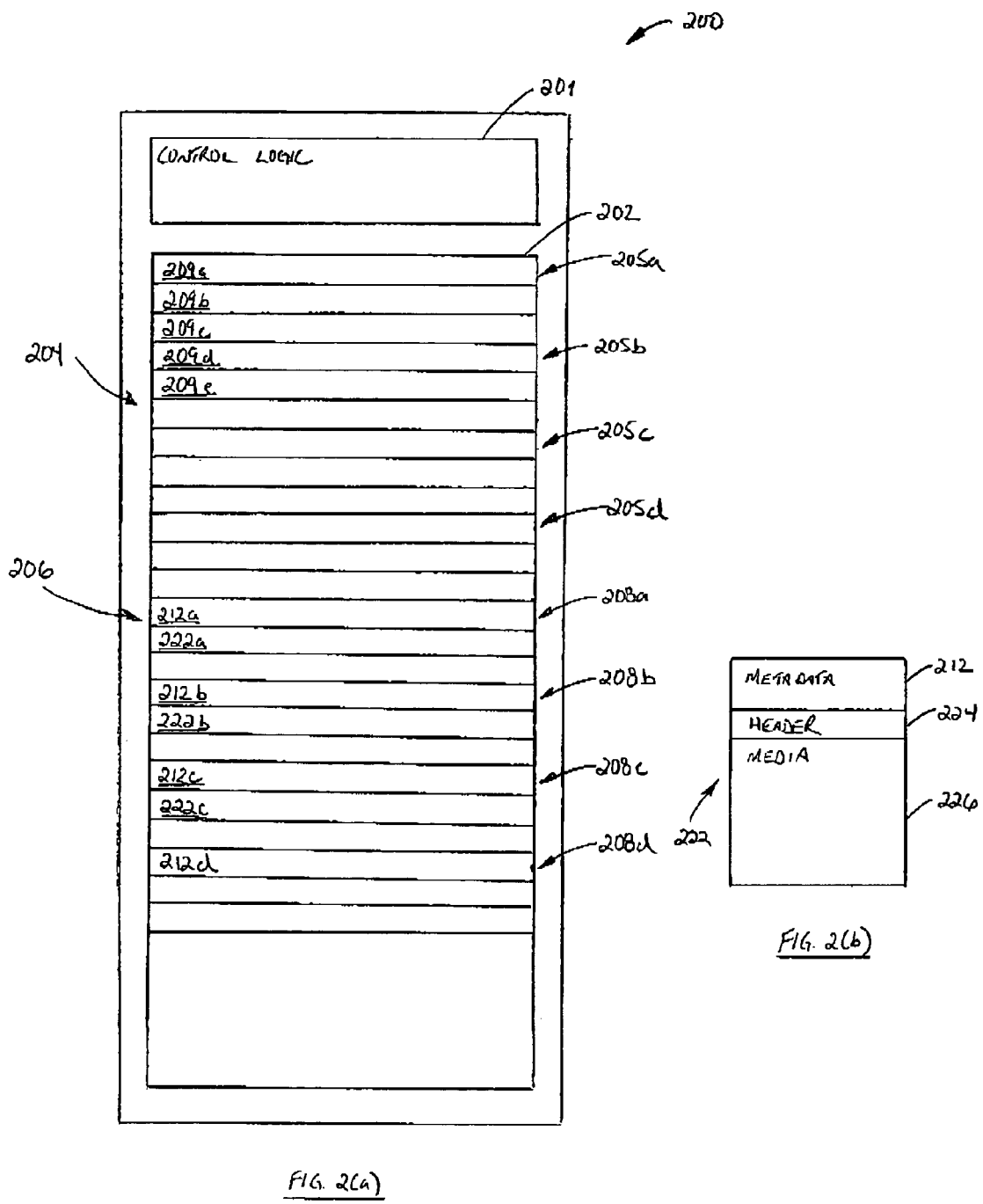
FIG. 2(a) shows in diagrammatic form a multimedia flash disk memory device configured in accordance with another embodiment of the present invention.
FIG. 2(b) shows in diagrammatic form an enlarged view of an erase block for the multimedia flash disk memory device of FIG. 2(a)

Reference is next made to FIGS. 2(a) and 2(b), which show in diagrammatic form a flash disk memory device configured for a multimedia application according to another embodiment of the invention. The multimedia flash disk memory device is indicated by reference 200. The multimedia flash disk memory device 200 comprises a control logic module 201 and an array of memory media sectors 202. The file system comprises a first volume 204 and a second volume 206 which are mapped into the sectors 202 on the flash disk.

The first volume 204 comprises erase blocks 205, shown individually as 205a, 205b, 205c, ... 205j, in FIG. 2, and metadata sectors 209, shown individually as 209a, 209b, 209c, ... 209l. Each of the erase blocks 205 comprises a plurality of sectors. The sectors are available to store one or more sectors 209 of metadata. The remaining sectors are available for storing static data, i.e. data which does not change or changes infrequently.

The second volume 206 comprises erase blocks 208, shown individually as 208a, 208b, 208c, ... 208n, and metadata sectors 212, shown individually as 212a, 212b, 212c, ... 212m. Each of the erase blocks 208 comprises a plurality of sectors. The metadata sectors 212 are spaced out or arranged so that each of the erase blocks 208 includes one metadata sector 212, for example the sector 212a shown in FIG. 2. The other sectors are used to store file data.

For a multimedia application, the second volume 206 stores a large file which is pre-allocated to hold media data from multiple messages. Then as shown in FIG. 2(a), the large file is sub-divided into smaller allocation units 222, shown individually as 222a, 222b, 222c, ... 222n. According to this aspect, each of the allocation units 222 is allocated to an individual message. Each individual allocation unit 222 comprises a non-media portion 224 and a media portion 226 as shown in FIG. 2(b). Header and media data are stored in the allocation unit 222, and the header data may occupy less than a sector as described in more detail below. Using this arrangement, data for the individual message is transferred or moved between the flash disk device 200 and memory in telecommunication network or switching device (not shown) in units of the erase blocks 208.

It will be appreciated that according to this aspect, a single file uses only one inode. If all the sectors in the multimedia data file are pre-allocated during installation, there is no need for singly- and doubly-indirect sectors. This reduces the number of metadata sectors. Secondly, loosing an erase block impacts only one message. Thirdly, as messages are added or deleted, it is not necessary to constantly create and delete the files. This reduces the number of metadata accesses and the probability that a power loss will occur during a metadata access operation. Fourthly, accessing the flash memory in units of erase blocks allows a higher data transfer rate over single-sector accesses and increases efficiency.

For example, if the size of an erase block is NE sectors, and there one metadata sector per erase block, then the allocation unit in the message file is NE−1 sectors. In other words, a metadata sector and an allocation unit fit together in one erase block. The message file, in turn, comprises an array of allocation units numbered starting from zero.

A message may span multiple allocation units. A header is maintained at the beginning of the data stored in the allocation unit. The remainder of the allocation unit comprises the media payload or data. The header includes the following information fields:

invalid bit
message number
sequence number
next unit number

It will be understood that in most cases the size of the header is less than the size of a sector.

Free allocation units not belonging to a multimedia message have the invalid bits in the headers set to one and are kept on a singly-linked list using the next unit number field in the header.

On the other hand, allocation units belonging to a multimedia message have the invalid bit fields in the headers set to zero. The message number fields in the headers have the same message number. For the first allocation unit, the sequence number field is 0, for the second allocation unit the sequence number field is 1, and so on for the following allocation units. The allocation units are kept in sequence number order on a singly-linked list using the next number field in the headers.

When a lost erase block comprises an allocation unit that is part of the multimedia message, the multimedia message is cut into two pieces and some multimedia data is lost. The surviving portion of the multimedia message may be reconstructed by identifying the allocation units having the same message number and ordered by the sequence number. The lost allocation unit(s) are identified according to the missing sequence numbers. Appropriate steps may then be taken to mitigate the effects of lost multimedia data, for example, a packet loss concealment algorithm.

When a lost erase block comprises a free allocation unit, the singly-linked list of free allocation units is cut into two pieces. The break is reparable by enumerating the allocated units and putting the remaining units on the free list.

The operation of a file or data structure according to the present invention is further illustrated by the following example, in which relatively static data and dynamic data are both to be stored on a flash disk memory device or other similar type of read/write mass storage device. The static data comprises 100 two-sector files that do not change, for example, web site data or online help data. The size of the erase block (indicated by reference 24 in FIG. 1) is 32 sectors (indicated by reference 26 in FIG. 1). Each one of the files includes an inode. The inode is another metadata structure, which includes information for the exact file size in bytes and the last modification time. In this example, each of the sectors (indicated by reference 26 in FIG. 1) can store four inodes. For 100 files, there are 100 inodes, and with 4 inodes/sector, 25 of the sectors 26 (FIG. 1) are needed to store the inodes. In accordance with this aspect of the invention, since the two-sector files comprise relatively static data, the data is stored in the first or static volume (indicated by reference 14 in FIG. 1), and the 25 inodes are stored consecutively in 25 sectors 26 (FIG. 1) of one of the erase blocks 24, for example, 24a (FIG. 1). Accordingly, efficiencies are realized by packing the metadata into consecutive sectors 26 (FIG. 1) in one of the erase blocks 24 (FIG. 1) in the first volume 14 (FIG. 1).

On the other hand, if the inodes are associated with dynamic data, i.e. data that is rewritten, then the metadata is stored in the second or dynamic volume 16 (FIG. 1). As described above, in the dynamic volume 16, each of the erase blocks 18 (FIG. 1) includes one sector 20, for example the sector 20a, for storing metadata. Then for 100 files requiring 100 inodes (according to the example), 800 sectors 20 (i.e. 25×32 sectors) are required because only one inode sector can be placed in an erase block 18 (i.e. run of 32 sectors 20) with the remaining sectors 20 (i.e. 1 to 31) being used for storing data. However, since the file data comprises 200 sectors (i.e. 100 files ×2 sectors), only 25.8% of the available 775 data sectors are utilized. Therefore, efficiencies are realized by utilizing the first or static volume 14 (FIG. 1) for storing static data.

Figure 3:
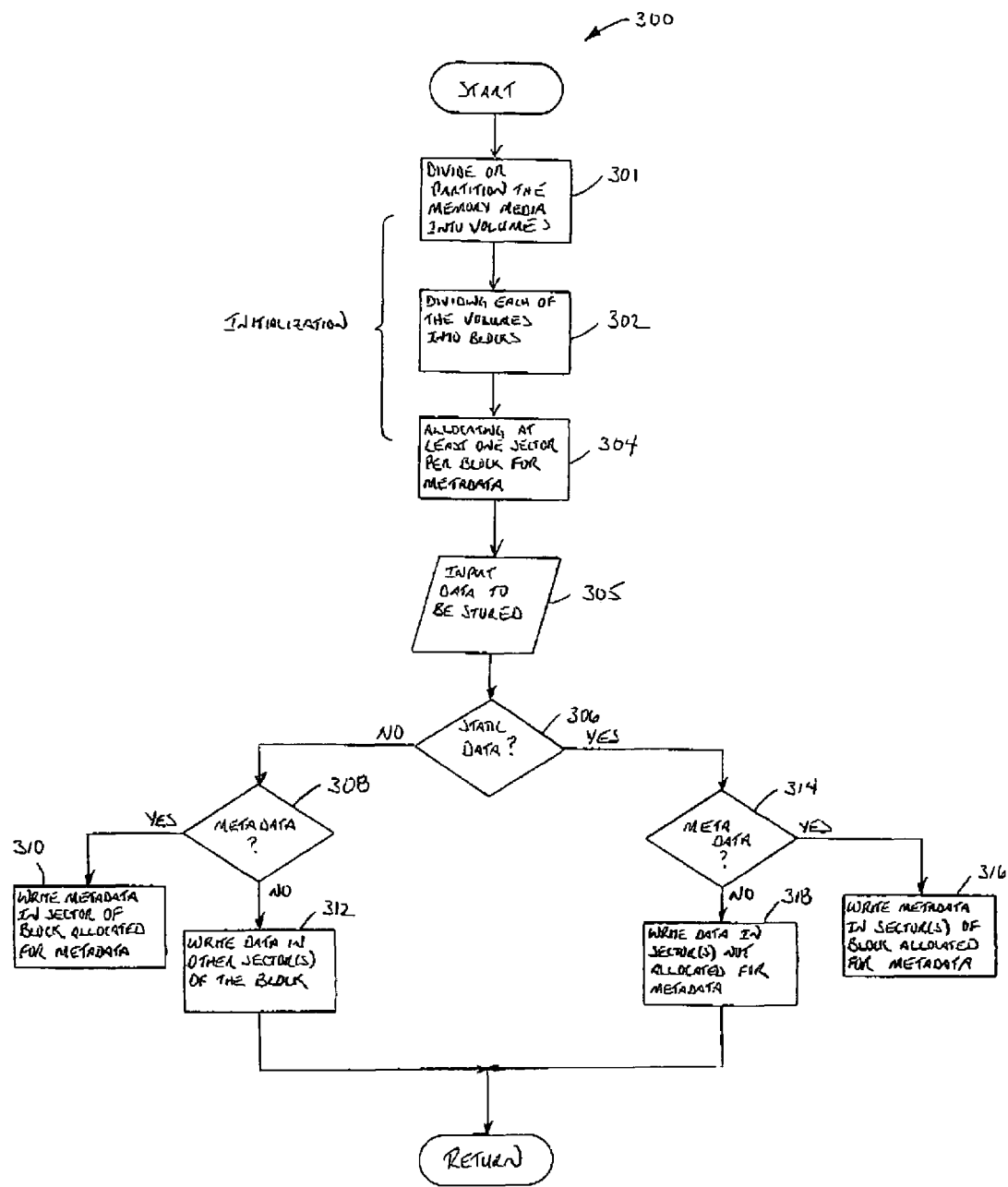
FIG. 3 shows in flow-chart form a process for managing data in accordance with the present invention.

Reference is next made to FIG. 3, which shows in flow-chart form a simplified process for storing data on flash disk memory media (for example, the flash disk memory device 10 of FIG. 1) in accordance with another aspect of the present invention. The process is indicated by reference 300. The first step 301 comprises dividing or partitioning the memory media into two volumes: a first, e.g. static, volume and a second, e.g. dynamic, volume. The next step 302 comprises dividing each of the first and the second volumes into blocks or erase blocks, for example, with each block having 32 sectors. Next in step 303, for each of the erase blocks in the second volume, at least one sector is designated for reading/writing metadata. The steps 301 to 304 may be performed as part of an initialization or formatting operation. Once the memory media is configured into a first volume and a second volume, memory management functions of reading, writing, and erasing data are performed according to the data type. The data is classified as either static data or as dynamic data. Static data is data which is relatively stable and is not changed, i.e. rewritten frequently over time. Dynamic data, on the other hand, is data that changes and is rewritten frequently. If the data is dynamic data as determined in decision block 306, then the data is stored in the second volume on the memory device. Next in decision block 308, the dynamic data to be stored in the second, i.e. dynamic, volume is processed either as metadata or regular data. If the data is metadata, then the data is written in the sector in one of the erase blocks allocated to metadata (block 310). If the data is not metadata, then the data is written to the data portion of the associated erase block (block 312). If the data is static data (as determined in decision block 306), then the data is stored in the first, i.e. static, volume. In decision block 314, the static data is stored either as metadata or regular data. If the static data is metadata, then the data is written in a sector in the erase block or erase blocks designated for metadata (block 316). As described above, static data comprising metadata may be written in contiguous sectors spanning one or more erase blocks. If the static data is not metadata, the data is written into one of the sectors in the other erase blocks or after the last sector allocated for metadata (block 318). It will be appreciated that the allocation and management of the sectors and erase blocks will typically be under the control of a memory management function or controller coupled to or interfacing with the memory device.

The operation of a process or technique for storing data on flash disk memory media is further illustrated at an implementation level with reference to the accompanying pseudo code. The spacing out of metadata sectors as described above is implemented at a device driver level. The file system issues read/write requests to the device driver, and a read/write request includes the following parameters;
volume
starting sector number I
sector count N The static volume and the dynamic volume each comprise an array of sectors, numbered starting at zero. The flash memory in turn comprises an array of sectors numbered starting from zero. The static volume begins at sector $I_S$ and the dynamic volume begins at sector $I_D$.

In response to the read/write request from the file system, the device driver translates the starting sector number before passing it on to the flash memory as follows:

```
if volume is static then
    I <- I_S+I
else if volume is dynamic then
    if I<NM then
        I <- I_D+I*NE
    else
        I <- I-NM
        I <- I_D+(I div (NE-1))*NE+(I mod (NE-1))+1
    end if
end if
```

There are NM metadata sectors in the dynamic volume, and logically the metadata sectors occupy the beginning of the volume. The translation process according to the present invention spreads the NM metadata sectors out, i.e. one metadata sector per erase block. There are NE sectors per erase block.

In accordance with another aspect, a multiple sector metadata access in the dynamic volume comprises a sequence of single sector accesses. If a single data access in the dynamic volume has to cross a metadata sector, then the single access is turned into a pair of accesses as follows:

```
If (I mod NE)+N > NE then
    I1 <- I
    N1 <- NE-(I mod NE)
    I2 <- I+N1+1
    N2 <- N-N1
end if
```

It will be appreciated that for this segment, the sector number I has already been translated. The first access starts at sector I1 and continues for N1 sectors. The second access starts at sector I2 and continues for N2 sectors.

The process or algorithm executed by a device driver takes the form, expressed in pseudo code, as follows:

```
if volume is static then
    I <- I_S + I
    access (I,N)
else if volume is dynamic then
```

-continued

```
if I<NM Then
    I <- I_S+I*NE
    for i from 1 to N
        access(I, 1)
        I <- I+NE
    end for
else
    I <- I-NM
    I <- I_D+(I div (NE-1))*NE+(I mod (NE-1))+1
    if (I mod NE)+N ,<= NE then
        access(I,N)
    else
        I1 <- I
        N1 <- NE-(I mod NE)
        access(I1, N1)
        I2 <- I+N1+1
        N2 <- N-N1
        access(I2, N2)
    end if
end if
end if
```

It will be understood that 'access(I, N)' indicates reading/writing the flash array starting at sector I for N sectors.

For example, the flash disk memory device 200 configured for multmedia as described above with reference to FIG. 2 will have NE=3. $I_S$=0, $I_D$=12, NM=4.

The present invention may be embodied in other specific forms without departing from the spirit or essential characteristics thereof. Other adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A memory device for storing data, said data including metadata, said memory device comprising:
    a static volume comprising a plurality of static blocks, and each of said static blocks comprising a plurality of sectors;
    a dynamic volume comprising a plurality of dynamic blocks, and each of said dynamic blocks comprising a plurality of sectors;
    each of said dynamic blocks having one of said sectors allocated for writing and reading metadata, and said remaining sectors in said dynamic block being available for writing and reading data; and
    each of said static blocks having one or more sectors for writing and reading metadata, said remaining sectors in said static block being available for writing and reading data,
    wherein each of said static blocks and each of said dynamic blocks is an erase block, and wherein each of said erase blocks is a minimum erasable portion of said memory device.

2. The memory device as claimed in claim 1, wherein each of said erase blocks is erasable in response to a control signal.

3. The memory device as claimed in claim 2, wherein one or more of said erase blocks are movable in response to a control signal.

4. A data structure stored in a computer-readable memory device for storing data, said data including metadata, said data structure comprising:

a static volume comprising a plurality of sectors, each of said sectors being writable for storing data and readable for reading data;

a dynamic volume comprising a plurality of sectors, each of said sectors being writable for storing data and readable for reading data;

said sectors in said static volume being partitioned into static blocks, each of said static blocks having one or more sectors for writing and reading the metadata;

said sectors in said dynamic blocks being partitioned into dynamic blocks, and each of said dynamic blocks having one sector for writing and reading the metadata, and the remaining sectors being available for reading and writing data, wherein each of said static blocks and each of said dynamic blocks is an erase block, and wherein each of said erase blocks is a minimum erasable portion of said memory device.

5. The data structure as claimed in claim 4, wherein the data stored in said static volume comprises relatively static data.

6. The data structure as claimed in claim 5, wherein the sectors in each of said erase blocks are erasable in response to a control signal.

7. The data structure as claimed in claim 6, wherein one or more of said erase blocks is transferable in response to a control signal.

8. The data structure as claimed in claim 7, wherein the memory device comprises a flash disk.

9. A method for storing data on a flash disk memory device, said method comprising the steps of:
dividing the memory into a static volume and a dynamic volume, said static volume comprising a plurality of static blocks, and each of said static blocks comprising a plurality of sectors, said dynamic volume comprising a plurality of dynamic blocks, and each of said dynamic blocks comprising a plurality of sectors;

allocating one of the sectors in each of said dynamic blocks for writing and reading metadata;

making the remaining sectors in each of said dynamic blocks available for writing and reading dynamic data;

allocating one or more of the sectors in each of said static blocks for writing and reading metadata;

making the remaining sectors in each of said static blocks available for writing and reading static data, wherein each of said static blocks and each of said dynamic blocks is an erase block, and wherein each of said erase blocks is a minimum erasable portion of said memory device.

10. The method as claimed in claim 9, wherein each of said erase blocks is erasable in response to a control signal.

11. The method as claimed in claim 9, wherein one or more of said erase blocks are movable in response to a control signal.

12. A memory device for storing data, said data including metadata, said memory device comprising:
first memory means for storing data, said first memory means including a plurality of first memory blocks, and each of said first memory blocks having a plurality of sectors;

second memory means for storing data, said second memory means including a plurality of second memory blocks, and each of said second memory blocks having a plurality of sectors;

each of said second memory blocks having one of said sectors allocated for writing and reading metadata, and said remaining sectors in said second memory block being available for writing and reading data; and each of said first memory blocks having one or more sectors for writing and reading metadata, said remaining sectors in said first memory block being available for writing and reading data, wherein each of said first memory blocks and each of said second memory blocks is an erase block, and wherein each of said erase blocks is a minimum erasable portion of said memory device.

13. The memory device as claimed in claim 12, wherein each of said erase blocks is erasable in response to a control signal.

14. The memory device as claimed in claim 12, wherein one or more of said erase blocks are movable in response to a control signal.

* * * * *